Patented Feb. 28, 1939

2,148,654

UNITED STATES PATENT OFFICE 2,148,654

ORGANIC ESTERS OF CELLULOSE

George W. Seymour, Cumberland, Md., assignor to Celanese Corporation of America, a corporation of Delaware No Drawing. Application September 29, 1937.
Serial No. 166,327

20 Claims. (Cl. 260—230)

This invention relates to the treatment of organic derivatives of cellulose, such as the organic esters of cellulose, to make them, when formed into articles and dyed, fast to light and acid fading and to prevent them from breaking down under the action of light and heat.

An object of the invention is the economic and expeditious production of organic esters of cellulose that are more stable than those heretofore produced. Another object of the invention is the production of organic esters of cellulose that when formed into yarns, filaments, films and fabrics do not become weak upon exposure to light, heat and/or industrial gases. Another object of the invention is the production of organic derivatives of cellulose which, when formed into yarns, films or fabrics and dyed, do not fade due to a change in the organic derivative of cellulose upon exposure to light, heat and/or industrial gases. Other objects of the invention will appear from the following detailed description.

In the production of organic derivatives of cellulose there are produced various compounds that are either unstable or become unstable upon ageing, especially when subjected to light, heat, perspiration and/or industrial gases. Organic derivatives of cellulose containing these compounds and untreated, when formed into yarns or fabrics and dyed, have a tendency to change color and also lose strength. By treating the organic derivatives of cellulose in accordance with this invention these compounds are either removed or converted into less active compounds or are prohibited from exerting a detrimental effect on the organic derivatives of cellulose.

By employing this invention, organic derivatives of cellulose are produced that are very stable and remain stable for long periods of time. Materials made from organic derivatives of cellulose prepared in accordance with this invention are greatly improved in their resistance to acid fading or light fading over organic derivatives of cellulose made without this treatment. Furthermore, cellulose esters treated in accordance with this invention and dissolved in a solvent are less corrosive to spinning and casting equipment than when treated by prior methods. This property reduces the metallic content of the materials making possible clearer products.

In accordance with this invention, precipitated or solid organic derivatives of cellulose are treated, preferably at elevated temperatures, with a solution or dispersion of a compound derived from morpholine or its hydrogen substituted derivatives. Such compounds may be termed morpholine compounds, examples of which are phenylene dimorpholine, phenyl morpholine, phenylamino morpholine and parahydroxyphenyl morpholine. This treatment may be given in place of or in conjunction with the regular stabilizing treatment given organic derivatives of cellulose after their precipitation from the solutions or suspensions in which they are formed.

The morpholine compound, that is, a compound containing the radicle

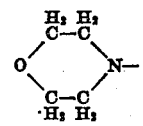

or derivatives thereof formed by a substitution at one or more of the hydrogens may be made by any suitable method. For instance, morpholine may be made by treating diethanolamine with sulphuric acid and then the morpholine reacted with the various alkyl, aryl or alkyaryl compounds to effect a coupling thereof by replacement of the H on the nitrogen atom to form the desired morpholine compound. The morpholine compound may also be formed by reacting B=B dichloroethyl ether with the amine compound it is desired to have coupled to the morpholine group.

Examples of morpholine compounds and their ascribed formulae are:

Phenylene dimorpholine

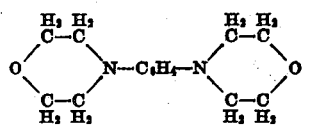

Phenylamino morpholine

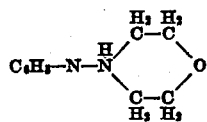

Phenyl morpholine

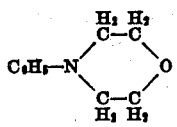

Parahydroxyphenyl morpholine

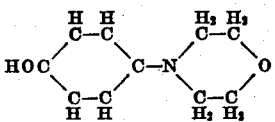

This invention is especially applicable to the treatment of any organic ester of cellulose, such as cellulose acetate, cellulose formate, cellulose propionate and cellulose butyrate made by any process whatsoever and especially processes wherein an inorganic acid is employed as catalyst or wherein the chemicals entering into the esterification process contact compounds containing sulphur or inorganic acids. It is also applicable, by obvious modifications, to the treatment of nitrocellulose, cellulose ethers and mixed ester-ethers of cellulose. Examples of cellulose ethers are ethyl cellulose, methyl cellulose and benzyl cellulose.

The organic esters of cellulose that lend themselves to this invention may be made by any of the methods now employed to make the same. For example, cellulose (cotton linters, cotton, wood pulp, etc.) with or without a pretreatment in organic acid, such as acetic and formic acid, is esterified by treating the same with an acid anhydride in the presence of an acid solvent and a catalyst. In place of the acid solvent or in connection therewith there may be used suspension liquids such as benzol. The acid solvent may be a concentrated acid corresponding to the anhydride employed or it may be, as is preferred, glacial acetic acid. Examples of catalysts are sulphuric acid, phosphorous acid, hydrochloric acid, zinc chloride and mixtures of these.

After esterification, sufficient water may be added to convert any remaining anhydride to the corresponding acid and the mixture hydrolyzed or ripened until the desired solubility characteristics are developed. The catalyst is then neutralized and water or other non-solvent for the ester added to precipitate the ester. The ester may also be extruded into a precipitating bath. During this precipitating step the ester may, if desired, be treated with a solution of a hypochlorite or other chlorine-liberating compound to reduce the color of same. The ester is then separated and washed free of the acid solution.

An ester of cellulose prepared as above described or by any other method is then given a treatment in accordance with this invention to stabilize the same. This treatment comprises treating the ester with a morpholine compound under such conditions that stabilization is effected. The morpholine compound is applied to the ester in any suitable manner, preferably as a fine dispersion in an aqueous media and at an elevated temperature. The quantity of the morpholine compound applied may vary from 3% or above on the weight of the cellulose ester down to below 0.1%. A large percentage of the morpholine compound present in the applied liquid is absorbed by the cellulose ester and is carried on through the subsequent process to which the cellulose ester may be subjected.

If desired, the morpholine compound may be applied to the cellulose ester from a dispersion of the same in an aqueous bath containing both the morpholine compound and an alcohol or polyhydric alcohol. The cellulose ester is submerged in the bath which is maintained at from 80° C. to 100° C. for from 10 minutes to 4 hours or longer. Also, if desired, the morpholine compound may be applied to the cellulose ester while the cellulose ester is in a solution or in a suspension such as a solution of cellulose acetate in acetone or a suspension of cellulose acetate in finely divided form in benzol.

It is preferable to have the precipitated cellulose ester in a finely divided form when treating the same with the morpholine compound. Cellulose ester in finely divided form may be obtained at the time it is precipitated from the ripening solution by vigorously beating in the water of precipitation effecting the production of the cellulose ester in a somewhat fibrous finely divided form. Also, the cellulose ester may be obtained in finely divided form by extruding the ripening solution through very fine orifices into a precipitating bath or exploding the cellulose ester by means of steam into a precipitating bath. The cellulose ester in finely divided form is readily penetrated by the morpholine compound which has a tendency to be absorbed thereby in much the same manner as a dye is absorbed. At the temperature of the treating bath the morpholine compound flows through the material and becomes substantially uniformly distributed therein.

The cellulose ester after treatment may be washed, dried and dissolved in suitable solvents to produce solutions for spinning filaments, casting films and making other articles. The solutions of the cellulose ester may be worked to articles by the methods well known in the art.

In a modified form of my invention, the morpholine compound may be added to the ripening solution of cellulose ester, preferably after neutralization of at least a part of the catalyst and just before precipitation. If desired, the morpholine compound may be added to the cellulose acetate ripening solution while it is in a beater and just before or during the addition of the precipitating liquid where such a method is employed or the morpholine compound may be added to the precipitating bath into which the cellulose ester is extruded or exploded.

In order to further describe my invention, but not as a limitation, the following example is given.

Example

Ripened precipitated cellulose acetate in finely divided form after being washed to remove excess acid is treated in an aqueous bath containing from 0.1% to 3% based on the weight of the cellulose acetate of phenylene dimorpholine. The bath is preferably about 10 times the weight of the cellulose acetate and maintained at a temperature of about 80° C. The treatment is continued for about 3 hours. The cellulose acetate is again washed and dried, then dissolved in acetone and spun by the dry method of spinning into yarns. The yarns are dyed blue with a water insoluble amino anthraquinone dye. The yarns are found to be more stable than similar yarns made from cellulose acetate stabilized by steam or hot water method. The colored yarns are exceptionally fast to light, heat and perspiration fading.

It is to be understood that the foregoing detailed description is merely given by way of illustration and that many variations may be made therein without departing from the spirit of my invention.

Having described my invention, what I desire to secure by Letters Patent is:

1. Process of stabilizing organic derivatives of cellulose, which comprises treating an organic derivative of cellulose in the form of fine particles with a morpholine compound.

2. Process of stabilizing organic esters of cellulose, which comprises treating an organic ester of cellulose in the form of fine particles with a morpholine compound.

3. Process of stabilizing cellulose acetate, which comprises treating cellulose acetate in the form of fine particles with a morpholine compound.

4. Process of stabilizing organic esters of cellulose, which comprises treating an organic ester of cellulose in the form of fine particles with phenylene dimorpholine.

5. Process of stabilizing cellulose acetate, which comprises treating cellulose acetate in the form of fine particles with phenylene dimorpholine.

6. Process of stabilizing organic esters of cellulose, which comprises treating an organic ester of cellulose in the form of fine particles with phenyl morpholine.

7. Process of stabilizing cellulose acetate, which comprises treating cellulose acetate in the form of fine particles with phenyl moropholine.

8. Process of stabilizing organic esters of cellulose, which comprises treating an organic ester of cellulose in the form of fine particles with phenylamino morpholine.

9. Process of stabilizing cellulose acetate, which comprises treating cellulose acetate in the form of fine particles with phenylamino morpholine.

10. Process of stabilizing organic esters of cellulose which comprises treating a solid organic ester of cellulose in the form of fine particles with a morpholine compound.

11. Process of stabilizing cellulose acetate, which comprises treating a solid cellulose acetate in the form of fine particles with a morpholine compound.

12. Process of stabilizing organic esters of cellulose, which comprises treating a solid organic ester of cellulose in the form of fine particles with an aqueous bath containing a morpholine compound.

13. Process of stabilizing cellulose acetate, which comprises treating a solid cellulose acetate in the form of fine particles with an aqueous bath containing a morpholine compound.

14. Process of stabilizing organic esters of cellulose, which comprises treating a solid organic ester of cellulose in the form of fine particles with a heated aqueous bath containing a morpholine compound.

15. Process of stabilizing cellulose acetate, which comprises treating a solid cellulose acetate in the form of fine particles with a heated aqueous bath containing a morpholine compound.

16. Process of producing organic esters of cellulose, which comprises esterifying cellulose, ripening the resulting cellulose ester, precipitating the cellulose ester in the form of fine particles, washing the cellulose ester and then treating it with an aqueous bath containing a morpholine compound.

17. Process of producing cellulose acetate, which comprises esterifying cellulose, ripening the resulting cellulose acetate, precipitating the cellulose acetate in the form of fine particles, washing the cellulose acetate and then treating it with an aqueous bath containing a morpholine compound.

18. Process of producing organic esters of cellulose, which comprises esterifying cellulose, ripening the resulting cellulose ester, adding a morpholine compound to the ripened ester and precipitating the said ester in the form of fine particles.

19. Process of producing cellulose acetate, which comprises esterifying cellulose, ripening the resulting cellulose acetate, adding a morpholine compound to the ripened cellulose and precipitating the said cellulose acetate in the form of fine particles.

20. Process of stabilizing an organic ester of cellulose, which comprises treating an organic ester of cellulose in the form of fine particles with from 0.1% to 3% on the weight of the organic ester of a morpholine compound.

GEORGE W. SEYMOUR.